United States Patent
Lopatinsky et al.

(10) Patent No.: US 6,249,071 B1
(45) Date of Patent: *Jun. 19, 2001

(54) ROTOR DRIVE MOTOR WITH U-SHAPED STATOR CORES

(75) Inventors: Edward L. Lopatinsky; Saveliy T. Rosenfield, both of San Diego, CA (US)

(73) Assignee: Advanced Rotary Systems LLC, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/303,334

(22) Filed: Apr. 30, 1999

Related U.S. Application Data (63) Continuation-in-part of application No. 09/172,524, filed on Oct. 14, 1998.

(51) Int. Cl.[7] ................................ H02K 1/27; H02K 1/06
(52) U.S. Cl. ................... 310/156.38; 254/62; 254/254
(58) Field of Search .................... 310/62, 63, 86, 310/156, 179, 184, 254, 164, 216, 218; 318/254; 417/356, 423.1; 416/3 FOR; 415/10

(56) References Cited

U.S. PATENT DOCUMENTS

| | | | |
|---|---|---|---|
| 4,367,413 | * | 1/1983 | Nair ........................................ 290/52 |
| 4,553,075 | * | 11/1985 | Brown et al. ......................... 318/254 |
| 5,290,227 | * | 3/1994 | Pasque ................................... 600/16 |
| 5,474,429 | * | 12/1995 | Heidelberg et al. ................. 417/356 |
| 5,607,329 | * | 3/1997 | Cho et al. ................................. 440/6 |
| 5,616,974 | * | 4/1997 | Yamada .............................. 310/68 B |
| 5,695,471 | * | 12/1997 | Wampler .............................. 604/131 |

FOREIGN PATENT DOCUMENTS

| | | | | |
|---|---|---|---|---|
| 58-066553 | * | 3/1986 | (JP) | ........................................ 310/62 |
| 61-052181 | * | 3/1986 | (JP) | ........................................ 310/63 |

* cited by examiner

*Primary Examiner*—Karl Tamai
(74) *Attorney, Agent, or Firm*—Edward Dreyfus (57) ABSTRACT

A rotor drive motor includes permanently magnetized blades with the opposite poles spaced apart along a radial direction. Two or more stators have a U-shaped core and coil winding, the legs extending radially inwardly and against a housing shroud. Each of the stators are energized in alternately reversed polarities to cause the blades to be rotated continuously. The housing may include a conduit sealed thereto isolating the stators and power circuit components from hazardous materials.

15 Claims, 6 Drawing Sheets

ROTOR DRIVE MOTOR WITH U-SHAPED STATOR CORES

CROSS REFERENCE OF RELATED APPLICATION

This application is a continuation-in-part of Ser. No. 09/172,524, filed on Oct. 14, 1998.

BACKGROUND OF THE INVENTION

This invention concerns an improvement to the rotor drive motor described in the parent application referenced above.

That application describes a rotor drive motor featuring permanently magnetized fan blades on the rotor which interact with the magnetic fields generated by stator coils arranged at each corner of an enclosing housing.

This greatly reduces the bulk of the fan hub by eliminating the conventional fan motor located at the fan hub, increasing the space available for air flow to substantially improve the performance and efficiency of the fan, particularly useful for installations in constrained spaces.

The fan blades are permanently magnetized in a radial orientation, with each successive blade having magnetic poles oppositely oriented relative to the poles of the adjacent magnetized fan blades. The polarity of the magnetic fields generated by the stator coils are successively reversed by reversing the current applied thereto as each fan blade passes each stator.

By this arrangement, the rotor drive motor stators are thereby located outside the air flow space.

The efficiency of this arrangement depends on the interaction between the stator magnetic field and the magnetic field of the permanently magnetized fan blades.

It is an object of the present invention to improve the output of this rotor drive motor by increasing the torque generated by the interaction of the stator coil and blade magnetic fields.

Another advantage of the improved rotor drive motor using exterior stator coils and magnetized fan blades is that the air flow does not pass through, past, or over the electrical components of the motor and controls.

It is another object of the present invention to provide a fan motor housing arrangement which isolates the air flow from any contact with the electrical components to render the fan suitable for use in an explosive or contaminated atmosphere.

SUMMARY OF THE INVENTION

These and other objects of the present invention which will be understood upon a reading of the following specification and claims are achieved by configuring the core of each stator in a U-shape, with the legs of the core each directed radially inwardly and abutting against the housing shroud. This core configuration has been found to increase the stator coil magnetic field flux density in the radial direction, and to thereby maximize the drive torque generated by the interaction of the stator coil and blade magnetic field. This, in turn increases the power output of the rotor drive motor and the fluid flow volume generated by rotation of the blades for a given electrical voltage applied to the stator coil windings.

The rotor drive preferably consists of only two stator coils, which are alternatively energized periodically in synchronism with the rotation of the magnetized rotor blades, which are permanently magnetized so as to be of successively opposite polarity.

A pair of sensors are positioned so as to be triggered as each blade sweeps past a detection location associated with each sensor, and power control circuitry causes each stator coil to be briefly energized by an electrical current of the proper polarity to cause a magnetic field to be generated interacting with each fan blade to drive the fan rotor in a given direction.

In a second aspect of the present invention, the blade shroud is sealed to fluid flow passage conduits thereby isolating the electrical components which are disposed externally of the shroud from the air flow.

DETAILED DESCRIPTION

In the following detailed description, certain specific terminology will be employed for the sake of clarity and a particular embodiment described in accordance with the requirements of 35 U.S.C. 112, but it is to be understood that the same is not intended to be limiting and should not be so construed inasmuch as the invention is capable of taking many forms and variations within the scope of the appended claims.

Figure 1:
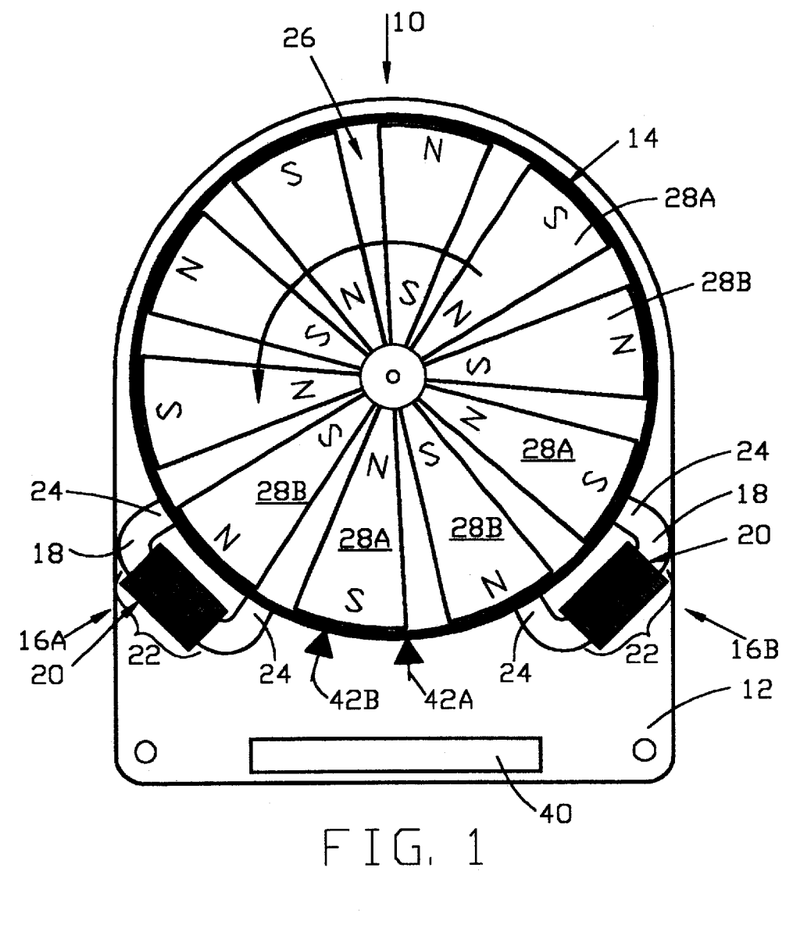
FIG. 1 is an end view of a fan incorporating a rotor drive motor according to the present invention.
Figure 2:
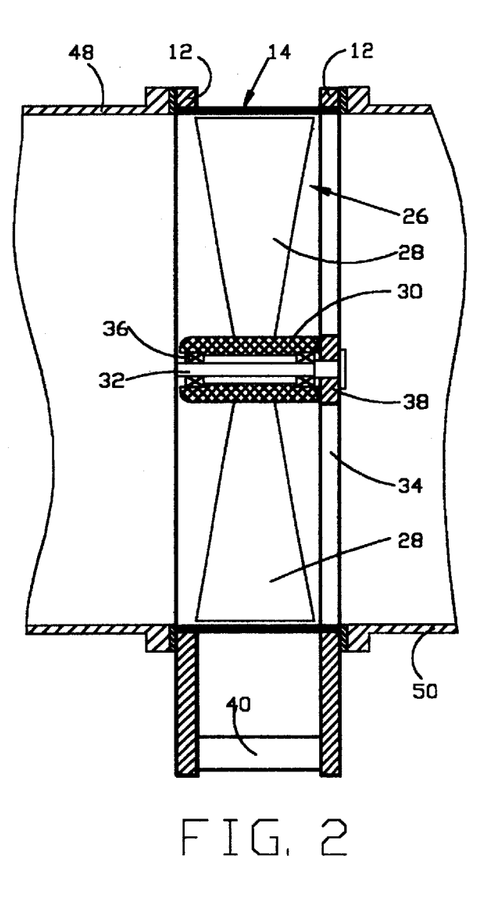
FIG. 2 is a partially sectional view of the rotor drive motor shown in FIG. 1.

Referring to FIGS. 1 and 2, the rotor drive motor 10 according to the present invention includes a housing comprised of mounting flanges 12 integral with a cylindrical shroud housing 14.

Disposed at two corners of the flanges 12 are two stators 16A–16B, comprised of a U-shaped core 18 with windings 20 around the section 22 connecting the two legs 24.

Each leg 24 extends in an approximately radial direction with respect to the rotor 26.

Figure 3:
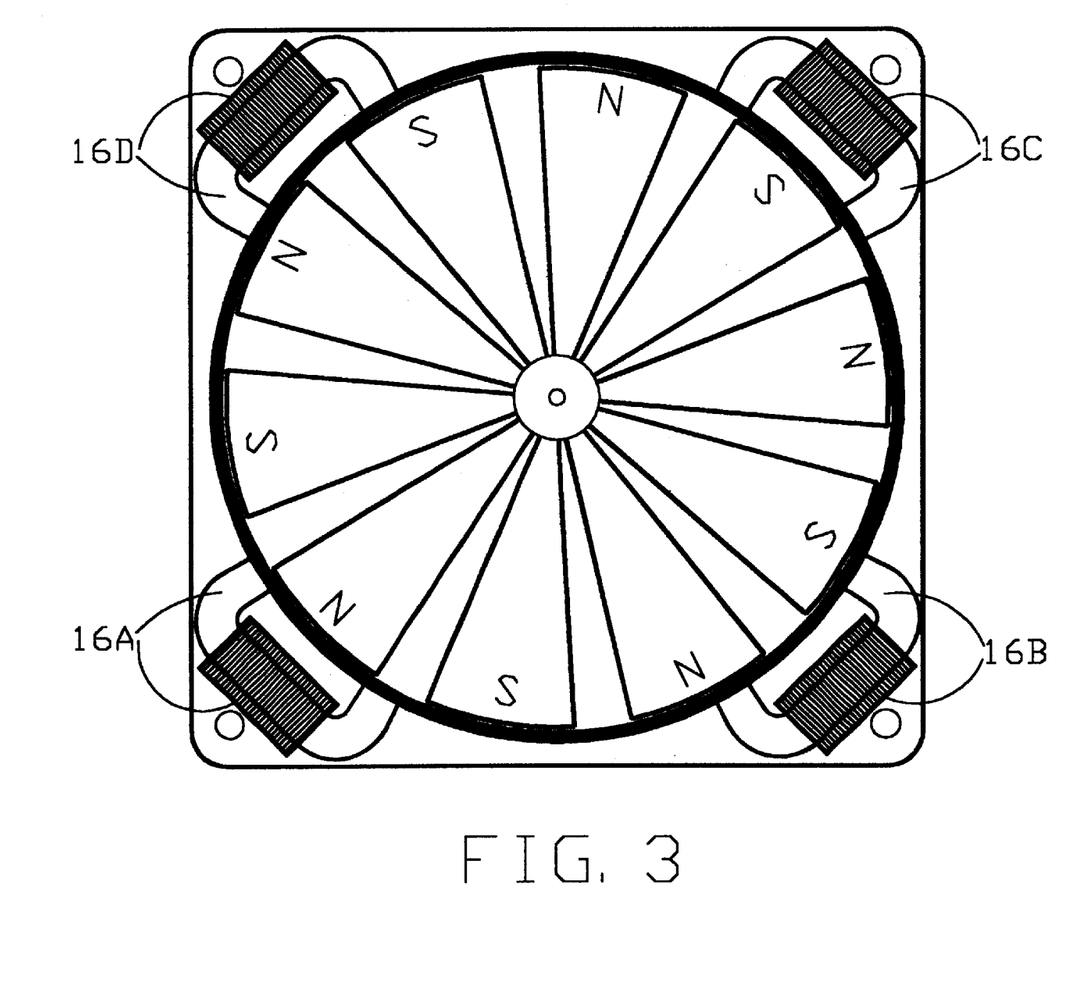
FIG. 3 is an end view of a second embodiment of the invention.

The rotor 26 is comprised of an array of radially extending fan blades 28, which are magnetized to have the respective poles spaced apart in a radial direction, with successive blades 28A, 28B in the array of alternately opposite polarity as indicated. As seen in FIGS. 1 and 3, the magnetized blade portion includes the radially outer portion which is bounded by the leading edge of each blade, and each core leg has a circumferential width that is less than the circumferential width of the magnetized blade portion.

The fan blades 28 are fixed to (or integrally formed with) a central hub 30 included in the rotor 26 which is rotatable on bearings 36, a support axle 32 held by a series of struts 34 extending across a circular opening defined within the flange 12 to a central web 38.

The fan blades 28 are preferably constructed of permanently magnetized plastic of a known material or have pieces of ferromagnetic material applied thereto which may be magnetized. Magnetized plastic material avoids the build up of static electricity which could otherwise occur, to prevent any resultant sparking due to a discharge of such static.

The housing portions are of a non-ferromagnetic material such as a suitable plastic, which is nonetheless freely permeable by magnetic flux.

A stainless steel shroud also produces very good performance of the rotor drive.

For a particular fan of 5 inches diameter, the thickness of the shroud 14 has been found to preferably be between ⅛–¼ inch. This thickness substantially defines the gap between the ends of the stator core legs 24 and the outer tips of the blades 28, when adding a slight clearance between the blade tips and the inside surface of the shroud 14 to allow for thermal expansion. The size of the gap has been found to significantly affect the driving power developed. Accordingly, a fan having a varied diameter would have a proportionately varied shroud thickness.

The details concerning the fan blades 28 and bearing axis support are similar to those disclosed in the above referenced parent application.

Figure 5:
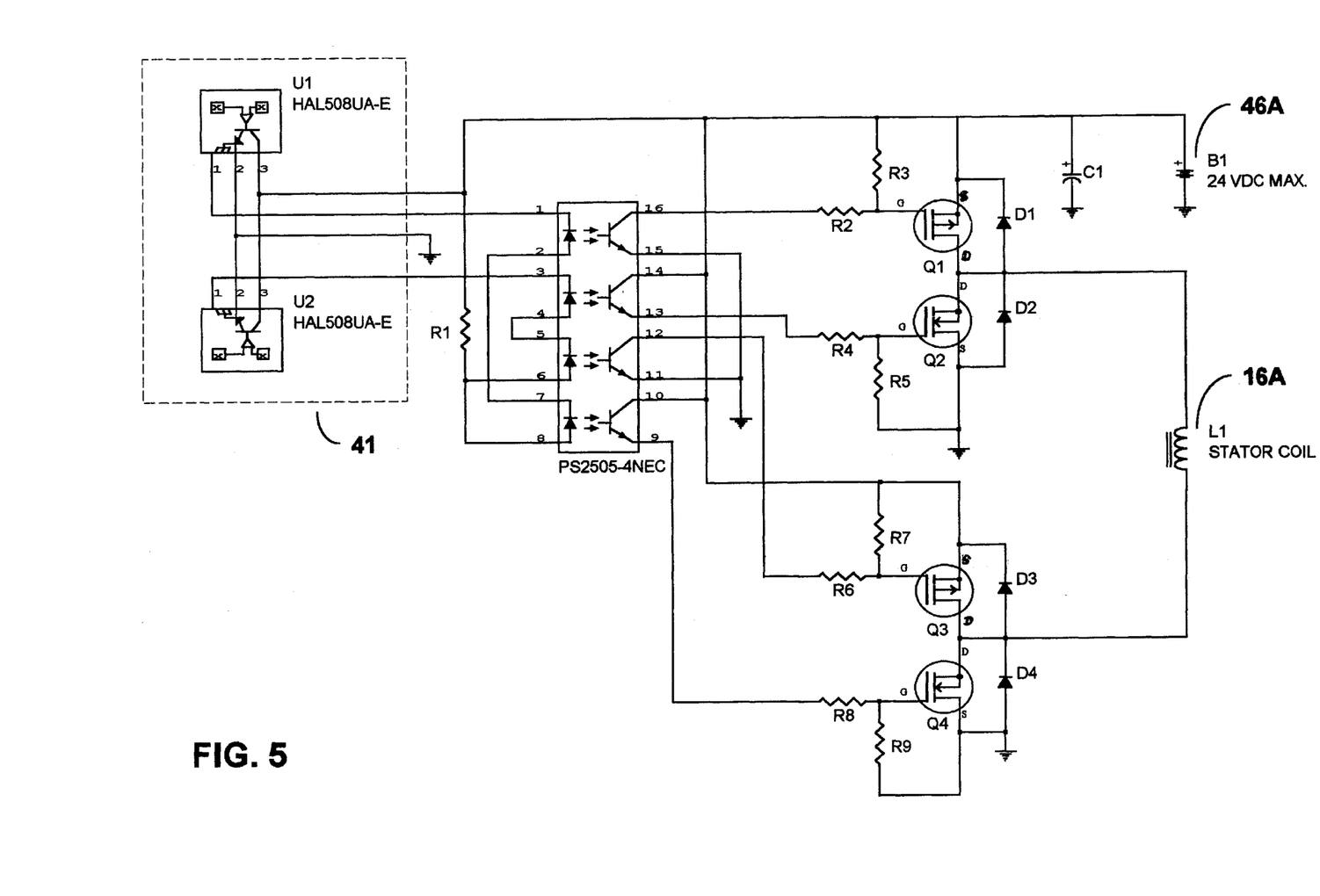
FIG. 5 is a schematic diagram of one of two identical electrical circuits for operating the rotor drive motor according to the invention.
Figure 6:
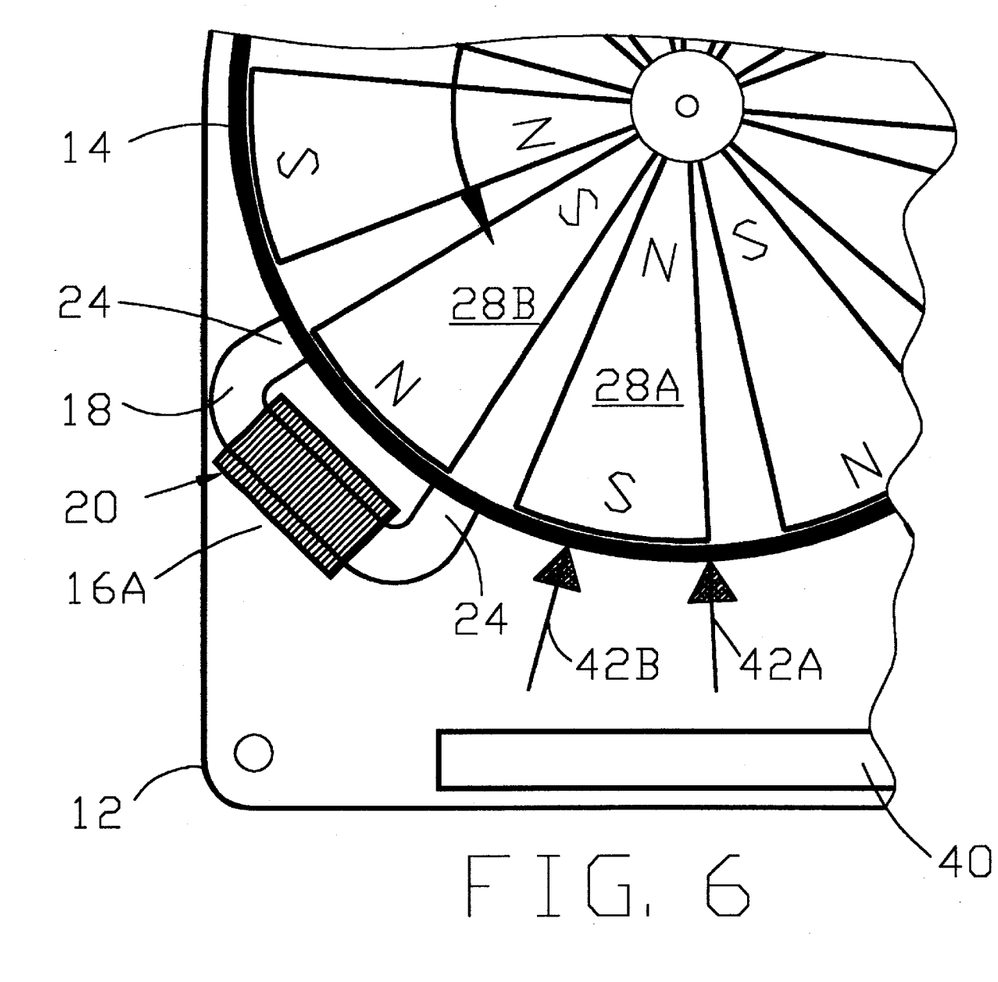
FIG. 6 is an enlarged fragmentary view of a portion of the embodiment shown in FIG. 1 with the stator and rotor blade.

The rotor drive includes two identical power and control circuits. The circuit diagram of one of the circuits is shown in FIGS. 5. The components of both circuits are preferably mounted on a single circuit board 40 attached to one of the flanges 12, and both preferably share the same power source.

As can be determined by a reviewing the circuit diagram in FIG. 5, the components in each circuit include a pair of uni-polar Hall effect sensors $U_1$ and $U_2$ of a commercially available type. In the preferred embodiment, $U_1$ and $U_2$ are enclosed in an IC package and can be purchased from Micronas, part number HAL508UA. The sensors $U_1$, $U_2$ are mounted on the circuit board 40 in close proximity to one another, and together comprise a sensor assembly 41. Each assembly 41 is oriented so as to be triggered upon the movement of a blade leading edge to a precise trigger point 42A, 42B, respectively. In the preferred embodiment, assembly 41 in one circuit is oriented so as to be triggered upon the movement of a blade leading edge to a precise trigger point 42A, and the assembly 41 in the other circuit is oriented to be triggered upon the movement of a blade leading edge to a precise trigger point 42B.

Each sensor $U_1$, $U_2$ acts as a switch and is triggered by the presence of a particular blade polarity, each sensor sensing the opposite polarity with respect to one another. In the preferred embodiment, $U_1$ is triggered by the presence of the north pole, and $U_2$ is triggered by the presence of the south pole. Together, uni-polar sensors $U_1$, $U_2$ serve to function as a dual output bipolar sensor.

The blades 28 are equally spaced apart a particular distance so that when a leading edge of a blade 28A or 28B reaches trigger point 42A, a next trailing blade 28B or 28A is centered between the legs 24 of the stator coil 16A. When a leading edge of a blade 28A or 28B reaches the trigger point 42B, a leading blade 28A or 28B is centered on the stator coil 16B (see FIGS. 4A–4D). Thus, only one blade 28A, 28B at a time can trigger sensors $U_1$, $U_2$ in each sensor assembly 41.

The respective trigger points 42A, B are oriented with blades 28 so that the respective stator coil 16A, B having a blade positioned between its legs 24 will energize upon startup.

Figure 4A:
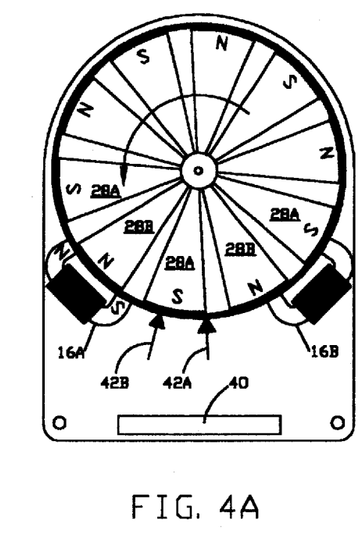
FIGS. 4A–4D are end views of the embodiment shown in FIG. 1 in different rotated condition of the fan blades, with a diagrammatic depiction of the energizing conditions of the two stator coils.
Figure 4B:
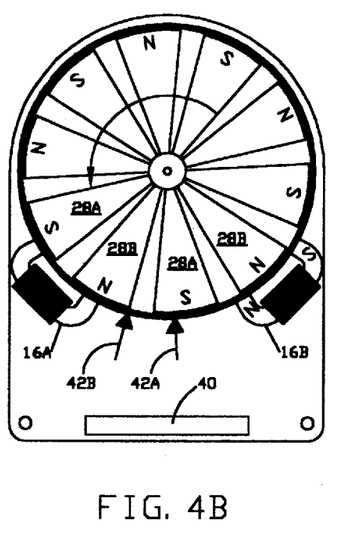

When the leading edge of a blade 28A registers with trigger point 42A, the coil of stator 16A is energized so as to produce the polarity indicated in FIG. 4A. When the sensor $U_2$ in the first circuit detects the leading edge of blade 28A, this causes an optical coupler IC package $U_3$ to establish high and low states on its terminals such as to turn on two of the P-channel and N-channel MOS-FETS $Q_1$, $Q_2$, $Q_3$ and $Q_4$ to apply positive voltage from a battery 46 (other power source) of the stator 16A and to ground the other side, setting up the magnetic polarity in FIG. 4A.

This causes the trailing blade 28B to be rotated counterclockwise by the repulsion-attraction set up. This rotation causes the sensor $U_2$ to turn off (at a point determined by the blade width and pitch angle), but the rotor 26 will continue to coast to the position shown in FIG. 4B.

At this point, a blade 28B moves into registry with the second trigger point 42B. This causes sensor $U_1$ $_{in}$ the second circuit to be activated, which in turn causes the windings 20 of stator coil 16B to be energized with an associated circuit so as to establish the magnetic polarity shown in FIG. 4B. This sets up a repulsion attraction with the blade 28B centered between the legs of stator 16B, to urge the rotor 26 to continue its counterclockwise rotation.

Figure 4C:
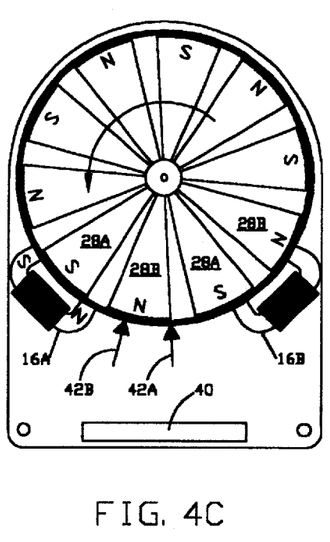
Figure 4D:
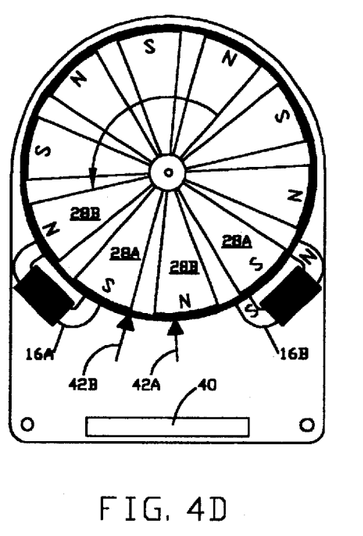

After stator 16B is de-energized by movement of the blade 28B past trigger point 42B, the rotor 26 coasts into the position shown in FIG. 4C, where a trailing blade 28B moves into registry with the trigger point 42A of sensor $U_1$ in the first circuit causing the stator 16A to be re-energized but with an opposite polarity as shown. The rotor 26 is again initially urged to rotate counterclockwise and coasts into the position shown in FIG. 4D after the stator 16A is de-energized.

This brings trigger point 42B of sensor $U_2$ in the second circuit into registry with a blade 28A, causing $U_2$ to be activated and the power circuit to re-energize stator 16B. The entire described four stage cycle repeats over and over to cause continuous counterclockwise rotation of the rotor 26.

In the preferred embodiment, the quad optical coupler IC package $U_3$ can be purchased from NEC under the part number PS2505-4NEC, the P-channel and N-channel MOS-FETS $Q_1$, $Q_2$ can be purchased by International Rectifier under the part number IRF4905, and the P-channel and N-channel MOS-FETS $Q_3$, $Q_4$ can be purchased by International Rectifier under the part number IRL3705N. The diodes D1–D4 in the circuit of FIG. 5 can be purchased by Liteon Power Semiconductor under the part number 1N4936CT. And finally, the remaining items are commercially available and preferably have values as follows: C1—2200 microfarad, 35 Volt; R1—4.7K Ohms, ½ Watt; R2, R4, R6, and R8—2.2K Ohms, ¼ Watt; and R3, R5, R7, and R9—10K Ohms, ¼ Watt.

It is to be understood that the above circuit could be modified by one skilled in the art to achieve acceptable results. For example, one of the sensors $U_1$, $U_2$ in each circuit could be removed. As such, each assembly 41 would act as a single uni-polar sensor rather than a bipolar sensor, and coils 16A, B would be energized with the same polarity during each cycle rather than being successively reversed in polarity. Consequently, the efficiency and performance would be reduced, but the intent of the invention would be realized.

Rotation can be reversed by reversing the polarity of the power source and resulting stator coil 16.

This arrangement locates the electrical components out of the path of the fluid flow. Accordingly, conduits 48, 50 may be sealed to the shroud as shown in FIG. 2 to allow use of the fan in hazardous environments.

FIG. 3 shows a four stator arrangement, utilizing two additional stators 16C, 16D (with additional sensors and power circuits, not shown).

Figure 7:
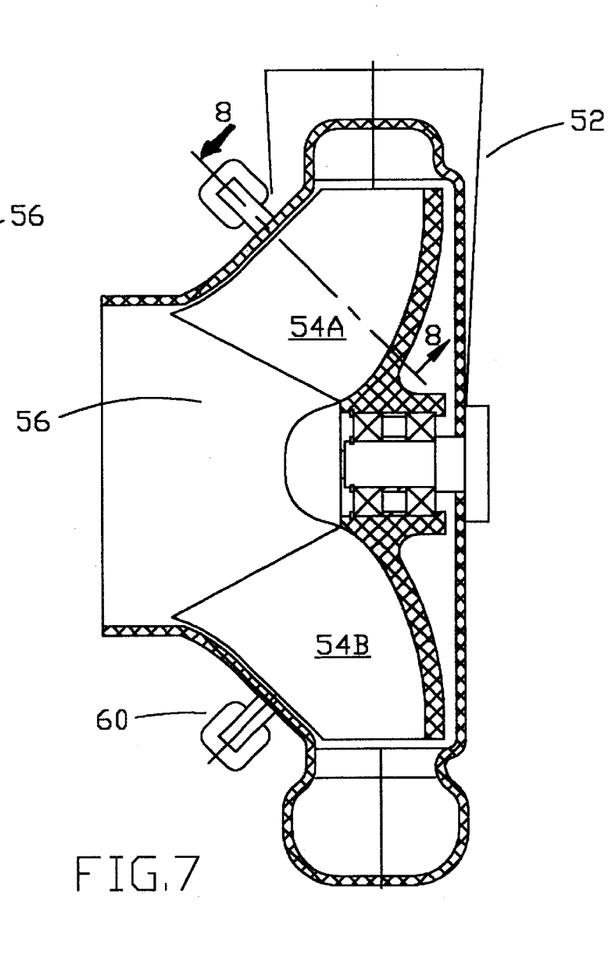
FIG. 7 is a partially sectional view of a centrifugal fan having an impeller driven by the rotor drive according to the present invention.
Figure 8:
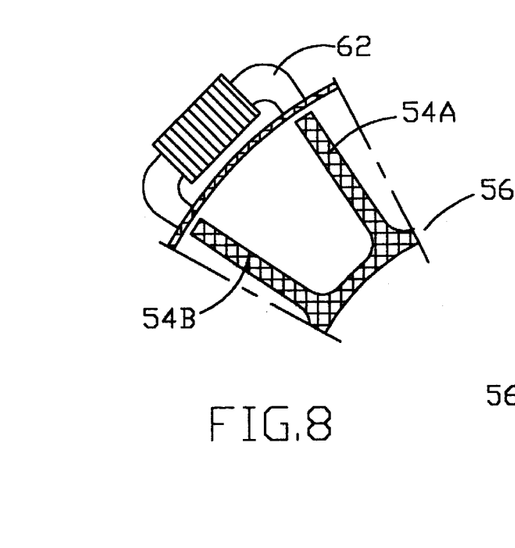
FIG. 8 is a view of the section 8—8 in FIG. 7.

FIG. 7 and 8 illustrate an application of the rotor drive to the impeller 56 of a centrifugal pump 52, in which the blades 54 of the impeller 56 are radially magnetized as described and stators 58, 60 provided with U-shaped cores 62.

What is claimed is:

1. A rotor drive motor comprising:
   a housing;
   a circumferential array of blades, radially extending from said hub, said hub rotatably mounted in said housing;
   each blade being circumferentially spaced from adjacent blades and comprising a permanently magnetized radially outer portion with a radial orientation of opposite poles which orientation for each blade is opposite to the orientation of respective adjacent blade radially outer portions,
   each blade having a leading edge and a trailing edge and said magnetized radially outer portion is bound by said leading edge;
   at least two stators each including a U-shaped ferromagnetic core defined by a pair of generally radially extending circumferentially spaced legs connected by a circumferentially extending section and a coil wound on said center section of said core, said core legs each extending approximately radially inwardly to a distal end spaced radially outwardly from said outer portion of said rotor blades; and
   wherein the circumferential width of each said distal end of each said core legs is less than the circumferential width of said magnetized radially outer portion of each blade, and
   a power supply for electrically energizing each of said stator windings successively as each blade rotates past a trigger point for each stator coil so as to generate torque acting so as to tend to produce rotation of said rotor by the interaction of the magnetic fields of said permanently magnetized blades and said stator coils.

2. The rotor drive motor of claim 1 wherein said housing includes a magnetically permeable shroud portion surrounding said blades, said at least two stators mounted to the housing outside of said shroud.

3. The rotor drive motor of claim 2 wherein four circumferentially spaced apart stators are mounted arrayed around a perimeter of said shroud.

4. The rotor drive motor of claim 2 wherein said shroud has an inner diameter of about five inches, and defines a gap between said core legs and said blade outer diameter a distance on the order of 1/8–1/4 inches.

5. The rotor drive motor of claim 1 wherein said blades are fan blades, and said housing has fluid flow conduits sealed thereto isolating gas flow from said stator and said power supply.

6. The rotor drive motor according to claim 2 wherein said shroud is plastic.

7. The rotor drive motor according to claim 2 wherein said shroud is stainless steel.

8. The rotor drive motor according to claim 1 wherein each successive blade in said array has an opposite polarity.

9. The rotor drive motor according to claim 1 wherein each stator is successively energized so as to have an opposite magnetic polarity.

10. The rotor drive motor according to claim 1 wherein each said radial outer portion extends circumferentially up to or between the radial edges of the respective blade.

11. The rotor drive motor according to claim 1 wherein the entire blade comprises a permanent magnet.

12. A rotor drive motor comprising:
    a housing;
    a circumferential array of blades, radially extending from said hub, said hub rotatably mounted in said housing;
    each blade having a permanently magnetized radially outer portion with a radial orientation of opposite poles which orientation for each blade is opposite to the orientation of respective adjacent blade radially outer portions;
    at least two stators each including a U-shaped ferromagnetic core defined by a pair of generally radially extending circumferentially spaced legs connected by a circumferentially extending section and a coil wound on a portion of said core, said core legs each extending approximately radially inwardly to a location closely spaced from an outer diameter of said rotor blades; and
    a power supply for electrically energizing each of said stator windings successively as each blade rotates past a trigger point for each stator coil so as to generate torque acting so as to tend to produce rotation of said rotor by the interaction of the magnetic fields of said permanently magnetized blades and said stator coils;
    wherein said power supply includes a pair of sensors, one of said stators energized by detection by one of said sensors of movement of a blade to a centered condition between the legs of one of said stator cores and causing said one stator to be energized so as to cause rotation to be centered over one leg thereof; and the other of said sensors detecting when a blade is centered between the other stator core legs and causes energizing of said other stator so as to cause rotation in the same direction to be centered over one leg of said other stator core.

13. The rotor drive motor according to claim 12 wherein said sensors are Hall effect sensors.

14. The rotor drive motor according to claim 12 wherein said power supply causes said stators to be alternately energized with opposite magnetic polarities as blades rotate past said sensors.

15. A rotor drive motor comprising:
    a housing;
    a circumferential array of blades, radially extending from said hub, said hub rotatable mounted in said housing;
    each blade having a permanently magnetized radially outer portion with a radial orientation of opposite poles which orientation for each blade is opposite to the orientation of respective adjacent blade radially outer portions;
    at least two stators each including a U-shaped ferromagnetic core defined by a pair of generally radially extending circumferentially spaced legs connected by a circumferentially extending section and a coil wound on a portion of said core, said core legs each extending approximately radially inwardly to a location closely spaced from an outer diameter of said rotor blades; and
    a power supply for electrically energizing each of said stator windings successively as each blade rotates past a trigger point for each stator coil so as to generate torque acting so as to tend to produce rotation of said rotor by the interaction of the magnetic fields of said permanently magnetized blades and said stator coils; and
    wherein said power supply includes a pair of sensors, one of said stators energized by detection by one of said sensors of movement of a blade to a predetermined location relative the legs of one of said stator cores and causing said one stator to be energized so as to cause rotation in one circumferential direction; and the other of said sensors detecting when a blade is at a predetermined location relative the other stator core legs and causes energizing of said other stator so as to cause rotation in the same circumferential direction.

* * * * *